US012574394B2

(12) United States Patent (10) Patent No.: US 12,574,394 B2
Givental et al. (45) Date of Patent: Mar. 10, 2026

(54) CYBERSECURITY INCIDENT INVESTIGATION AUTOMATION USING NATURAL LANGUAGE TRAINING

(71) Applicant: International Business Machines Corporation, Armonk, NY (US)

(72) Inventors: Gary I. Givental, Bloomfield Hills, MI (US); Carmen-Gabriela Stefanita, Boston, MA (US); Leszek Adamiak, Miami Beach, FL (US); Nicholson Naveen Eugene Paccelli, Wrocław (PL); Amita Edara, Johns Creek, GA (US)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 18/611,805

(22) Filed: Mar. 21, 2024

(65) Prior Publication Data

US 2025/0300995 A1 Sep. 25, 2025

(51) Int. Cl.
 H04L 9/40 (2022.01)
 G06N 20/00 (2019.01)
(52) U.S. Cl.
 CPC ......... H04L 63/1416 (2013.01); G06N 20/00 (2019.01); H04L 63/1441 (2013.01)
(58) Field of Classification Search
 CPC .. H04L 63/1416; H04L 63/1441; G06N 20/00
 See application file for complete search history.

(56) References Cited

U.S. PATENT DOCUMENTS

| | | | |
|---|---|---|---|
| 10,303,978 B1 | 5/2019 | Kang | |
| 11,218,510 B2 | 1/2022 | Crabtree | |
| 11,310,270 B1 | 4/2022 | Weber | |
| 11,509,689 B2 | 11/2022 | Weber | |
| 11,556,640 B1 | 1/2023 | Tully | |
| 2021/0306352 A1* | 9/2021 | Narula | G06N 5/04 |

(Continued)

FOREIGN PATENT DOCUMENTS

| | | |
|---|---|---|
| CN | 110489395 B | 7/2022 |

OTHER PUBLICATIONS

"Preparing For A Cyber Incident—An Introductory Guide", United States Secret Service Cybercrime Investigations, Version 1.1, Printed Jan. 3, 2024, 10 pages.

(Continued)

*Primary Examiner* — Shirley X Zhang

(74) *Attorney, Agent, or Firm* — James L. Olsen

(57) ABSTRACT

A method, computer program product, and computer system are provided for cybersecurity incident investigation automation. A potential cybersecurity threat is identified and categorized by a machine learning model. Evidence associated with the potential cybersecurity threat is gathered by the machine learning model. The potential cybersecurity threat is evaluated by the machine learning model based on the gathered evidence. A recommendation corresponding to one or more actions to take in response to the potential cybersecurity threat is provided by the machine learning model to a cybersecurity analyst. The machine learning model performs a follow-up action in response to the potential cybersecurity threat based on input from the cybersecurity analyst.

14 Claims, 4 Drawing Sheets

(56)  References Cited

U.S. PATENT DOCUMENTS

| | | | |
|---|---|---|---|
| 2024/0414190 A1* | 12/2024 | Lal ........................... | G06F 40/58 |
| 2025/0202762 A1* | 6/2025 | Izquierdo Franco ... | H04L 41/16 |

OTHER PUBLICATIONS

"System and Method for Predicting and Preventing Incidents with IT Service Management Platforms", An IP.com Prior Art Database Technical Disclosure, IP.com No. IPCOM000253179D, IP.com Electronic Publication Date: Mar. 12, 2018, 5 pages.
"The System and Method for Information Extraction of Human Trafficking Business of Interest from Disparate Unstructured Sources and Relationships with Involved Parties, Recruitment, Coercion, and Trafficking Method for Analysis and Pattern Study Using Natural Language Processing", An IP.com Prior Art Database Technical Disclosure, IP.com No. IPCOM000265106D, IP.com Electronic Publication Date: Feb. 25, 2021, 13 pages.
Cichonski et al., "Computer Security Incident Handling Guide", National Institute of Standards and Technology, U.S. Department of Commerce, Special Publication 800-61, Revision 2, Aug. 2012, 79 pages.
Singh et al., "Cyber Security Vulnerability Detection Using Natural Language Processing", Proceedings of the 2022 IEEE World IoT Congress (AIIoT), Jun. 6-9, 2022, Yokohama, Japan, 5 pages.
Steverson et al., "Cyber Intrusion Detection using Natural Language Processing on Windows Event Logs", Proceedings of the 2021 International Conference on Military Communication and Information Systems (ICMCIS), May 4-5, 2021, The Hague, Netherlands, 7 pages.

* cited by examiner

100

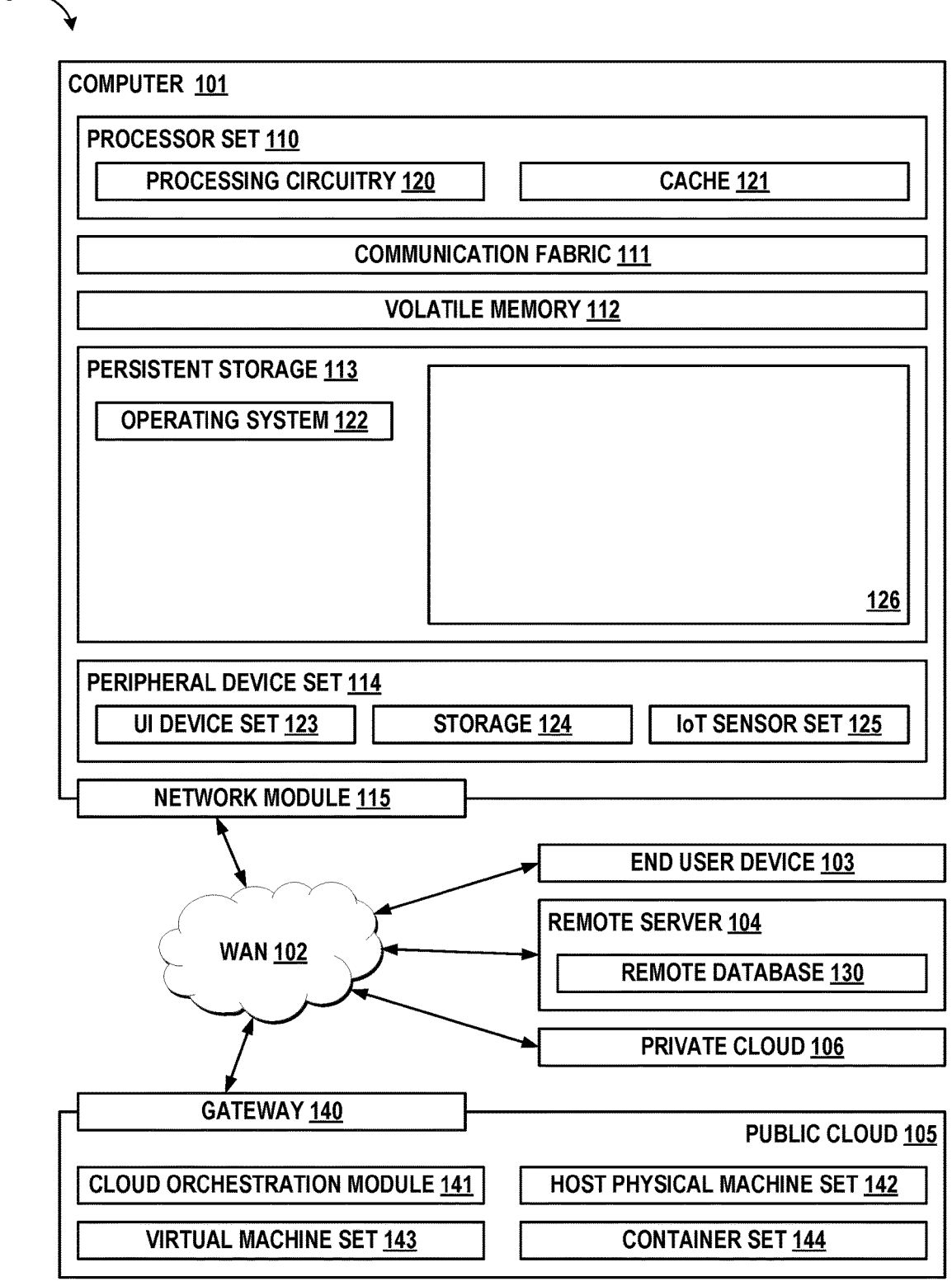

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

126

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

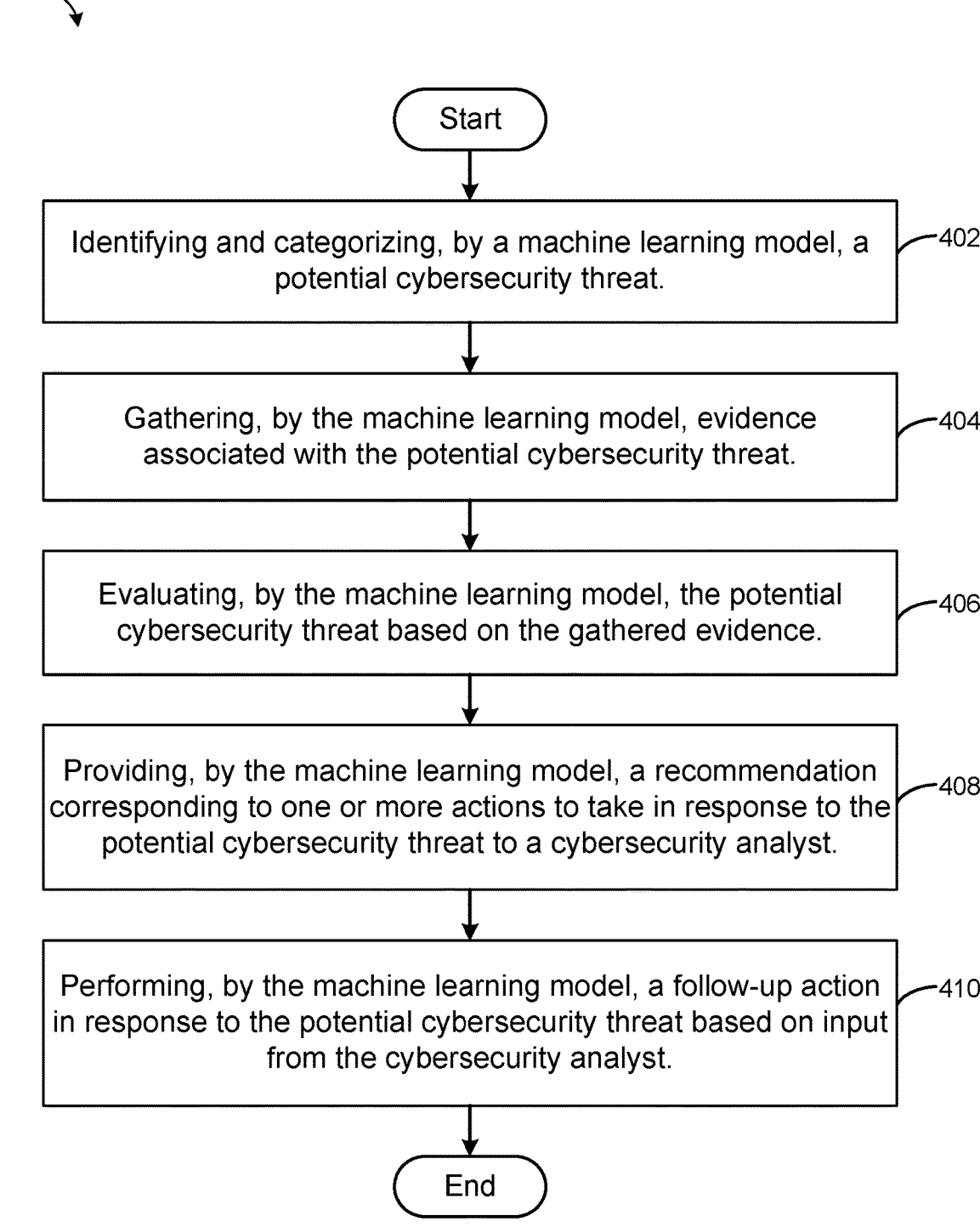

Start

Identifying and categorizing, by a machine learning model, a potential cybersecurity threat. —402

Gathering, by the machine learning model, evidence associated with the potential cybersecurity threat. —404

Evaluating, by the machine learning model, the potential cybersecurity threat based on the gathered evidence. —406

Providing, by the machine learning model, a recommendation corresponding to one or more actions to take in response to the potential cybersecurity threat to a cybersecurity analyst. —408

Performing, by the machine learning model, a follow-up action in response to the potential cybersecurity threat based on input from the cybersecurity analyst. —410

End

FIG. 4

CYBERSECURITY INCIDENT INVESTIGATION AUTOMATION USING NATURAL LANGUAGE TRAINING

FIELD

This disclosure relates generally to the field of cybersecurity, and more particularly to cybersecurity incident investigation.

BACKGROUND

A managed security service provider is an information technology service business that specializes in providing security-as-a-service, such as monitoring and management of security devices and systems. Common services include managed firewall, intrusion detection, virtual private network, vulnerability scanning and anti-virus services.

SUMMARY

Embodiments relate to a method, system, and computer program product for cybersecurity incident investigation automation. According to one aspect, a method for cybersecurity incident investigation automation is provided. The method may include identifying and categorizing, by a machine learning model, a potential cybersecurity threat. Evidence associated with the potential cybersecurity threat is gathered by the machine learning model. The potential cybersecurity threat is evaluated by the machine learning model based on the gathered evidence. A recommendation corresponding to one or more actions to take in response to the potential cybersecurity threat is provided by the machine learning model to a cybersecurity analyst. The machine learning model performs a follow-up action in response to the potential cybersecurity threat based on input from the cybersecurity analyst.

According to another aspect, a computer system for cybersecurity incident investigation automation is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include identifying and categorizing, by a machine learning model, a potential cybersecurity threat. Evidence associated with the potential cybersecurity threat is gathered by the machine learning model. The potential cybersecurity threat is evaluated by the machine learning model based on the gathered evidence. A recommendation corresponding to one or more actions to take in response to the potential cybersecurity threat is provided by the machine learning model to a cybersecurity analyst. The machine learning model performs a follow-up action in response to the potential cybersecurity threat based on input from the cybersecurity analyst.

According to yet another aspect, a computer program product for cybersecurity incident investigation automation is provided. The computer program product may include one or more computer-readable storage devices and program instructions stored on at least one of the one or more tangible storage devices, the program instructions executable by a processor. The program instructions are executable by a processor for performing a method that may accordingly include identifying and categorizing, by a machine learning model, a potential cybersecurity threat. Evidence associated with the potential cybersecurity threat is gathered by the machine learning model. The potential cybersecurity threat is evaluated by the machine learning model based on the gathered evidence. A recommendation corresponding to one or more actions to take in response to the potential cybersecurity threat is provided by the machine learning model to a cybersecurity analyst. The machine learning model performs a follow-up action in response to the potential cybersecurity threat based on input from the cybersecurity analyst.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings:

FIG. 1 illustrates a block diagram of a networked computer environment according to at least one embodiment;

FIG. 4 is an operational flowchart illustrating the steps carried out by a program that provides automation for cybersecurity incident investigation, according to at least one embodiment.

DETAILED DESCRIPTION

Figure 2:
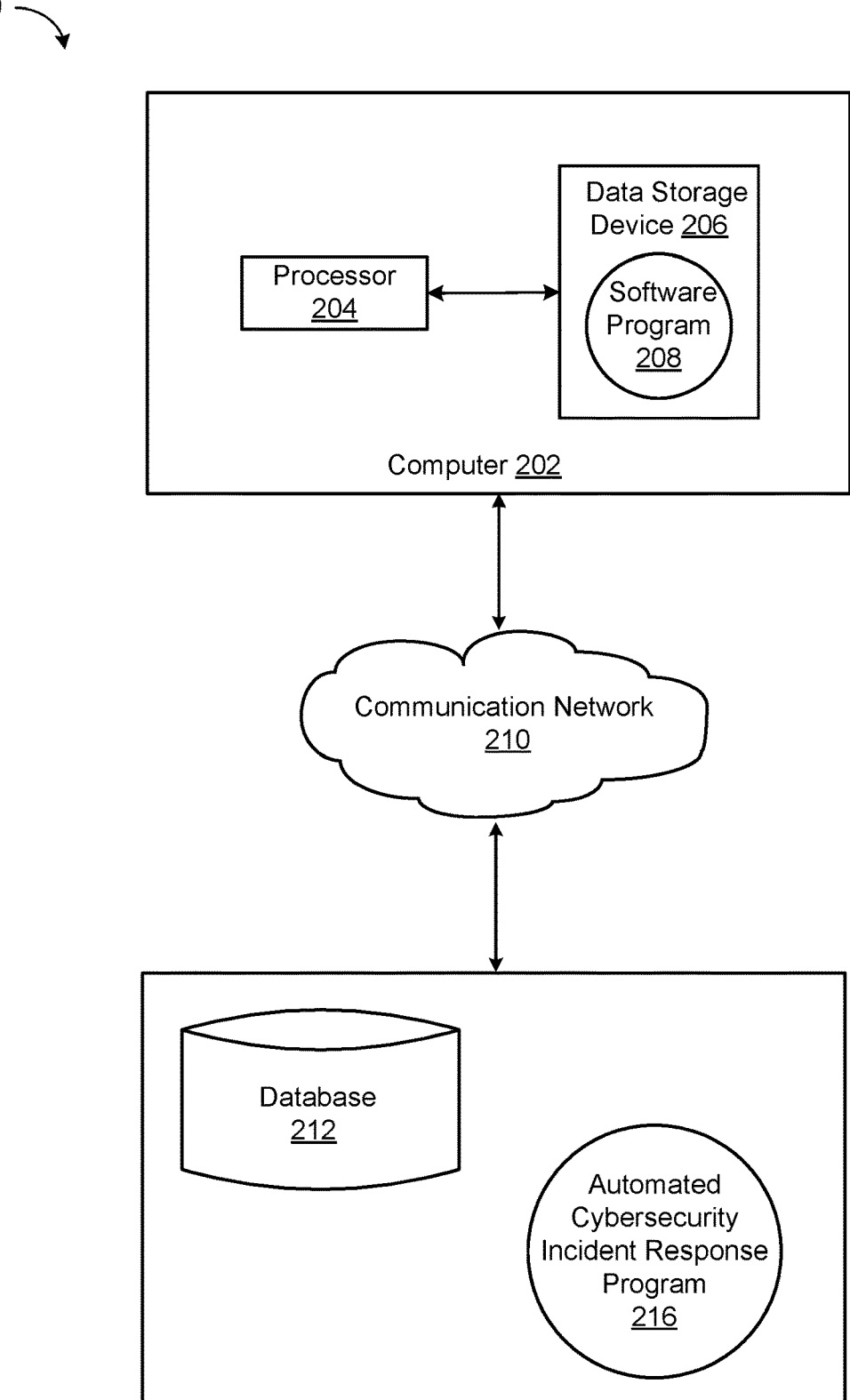
FIG. 2 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of cybersecurity, and more particularly to cybersecurity investigation. The following described exemplary embodiments provide a system, method, and computer program product to, among other things, provide automation for cybersecurity incident investigation. Therefore, some embodiments have the capacity to improve the field of computing by allowing for automation by a computer of cybersecurity threat identification, collection of additional evidence, providing of recommendations, and the ability to perform actions to address the cybersecurity threat.

As previously described, a managed security service provider is an information technology service business that specializes in providing security-as-a-service, such as monitoring and management of security devices and systems. Common services include managed firewall, intrusion detection, virtual private network, vulnerability scanning and anti-virus services.

Managed security service providers use high-availability security operation centers (either from their own facilities or from other data center providers) to provide 24/7 services designed to reduce the number of operational security personnel an enterprise needs to hire, train and retain to maintain an acceptable security posture. There is a growing need for managed security service providers to reduce pricing while improving the quality of threat analysis, and to apply a security analyst's best expertise at scale. However, while a managed security service provider may have dozens of security analysts working through incidents in systems, automation is not learning from these actions today. It may be advantageous, therefore, to utilize an automated system of investigation that follows analysts' actions, makes stepwise decisions, and provides auto-generated content like their own copy/pasted notes. The outcome of the automated system would include gathered evidence and would create the decision artifact.

The method, computer system, and computer program product disclosed herein may allow a machine learning model to learn from a security analyst using tools that allows the analyst to triage and determine a disposition to security threats, while the analyst narrates what they are doing and why. The machine learning model may record keyboard and mouse activity, combined with a transcribed natural language transcription of the analyst narration, in order to be trained to provide recommendations on accelerating the triage and response workflow to security incidents. As the machine learning model may make recommendations that are evaluated by analysts, the machine learning model may continue improving its recommendations. Once the reinforcement learning may allow the machine learning model to provide highly accurate threat triage recommendations (as well as response/follow-up action recommendations), the machine learning model may be able to take automated actions.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

The following described exemplary embodiments provide a system, method and computer program product that provides automation for investigation of and responses to potential cybersecurity threats. Referring now to FIG. 1, Computing environment 100 contains an example of an environment for the execution of at least some of the computer code involved in performing the inventive methods, such as Automated Cybersecurity Incident Response 126. In addition to Automated Cybersecurity Incident Response 126, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and Automated Cybersecurity Incident Response 126, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in Automated Cybersecurity Incident Response 126 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in Automated Cybersecurity Incident Response 126 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertiontype connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Referring now to FIG. 2, a functional block diagram of a networked computer environment illustrating an automated cybersecurity threat response system 200 (hereinafter "system") for automation of response to cybersecurity incidents. It should be appreciated that FIG. 2 provides only an illustration of one implementation and does not imply any limitations with regard to the environments in which different embodiments may be implemented. Many modifications to the depicted environments may be made based on design and implementation requirements.

The system 200 may include a computer 202 and a server computer 214. The computer 202 may communicate with the server computer 214 via a communication network 210 (hereinafter "network"). The computer 202 may include a processor 204 and a software program 208 that is stored on a data storage device 206 and is enabled to interface with a user and communicate with the server computer 214. The computer 202 may be, for example, a mobile device, a telephone, a personal digital assistant, a netbook, a laptop computer, a tablet computer, a desktop computer, or any type of computing devices capable of running a program, accessing a network, and accessing a database.

The server computer 214, which may be used for cybersecurity incident investigation automation is enabled to run an Automated Cybersecurity Incident Response Program 216 (hereinafter "program") that may interact with a database 212. Automated cybersecurity incident response is explained in more detail below with respect to FIG. 4. In one embodiment, the computer 202 may operate as an input device including a user interface while the program 216 may run primarily on server computer 214. In an alternative embodiment, the program 216 may run primarily on one or more computers 202 while the server computer 214 may be used for processing and storage of data used by the program 216. It should be noted that the program 216 may be a standalone program or may be integrated into a larger program.

It should be noted, however, that processing for the program 216 may, in some instances be shared amongst the computers 202 and the server computers 214 in any ratio. In another embodiment, the program 216 may operate on more than one computer, server computer, or some combination of computers and server computers, for example, a plurality of computers 202 communicating across the network 210 with a single server computer 214. In another embodiment, for example, the program 216 may operate on a plurality of server computers 214 communicating across the network 210 with a plurality of client computers. Alternatively, the program may operate on a network server communicating across the network with a server and a plurality of client computers.

The network 210 may include wired connections, wireless connections, fiber optic connections, or some combination thereof. In general, the network 210 can be any combination of connections and protocols that will support communications between the computer 202 and the server computer 214. The network 210 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a private network, an ad hoc network, an intranet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of system 200 may perform one or more functions described as being performed by another set of devices of system 200.

Figure 3:
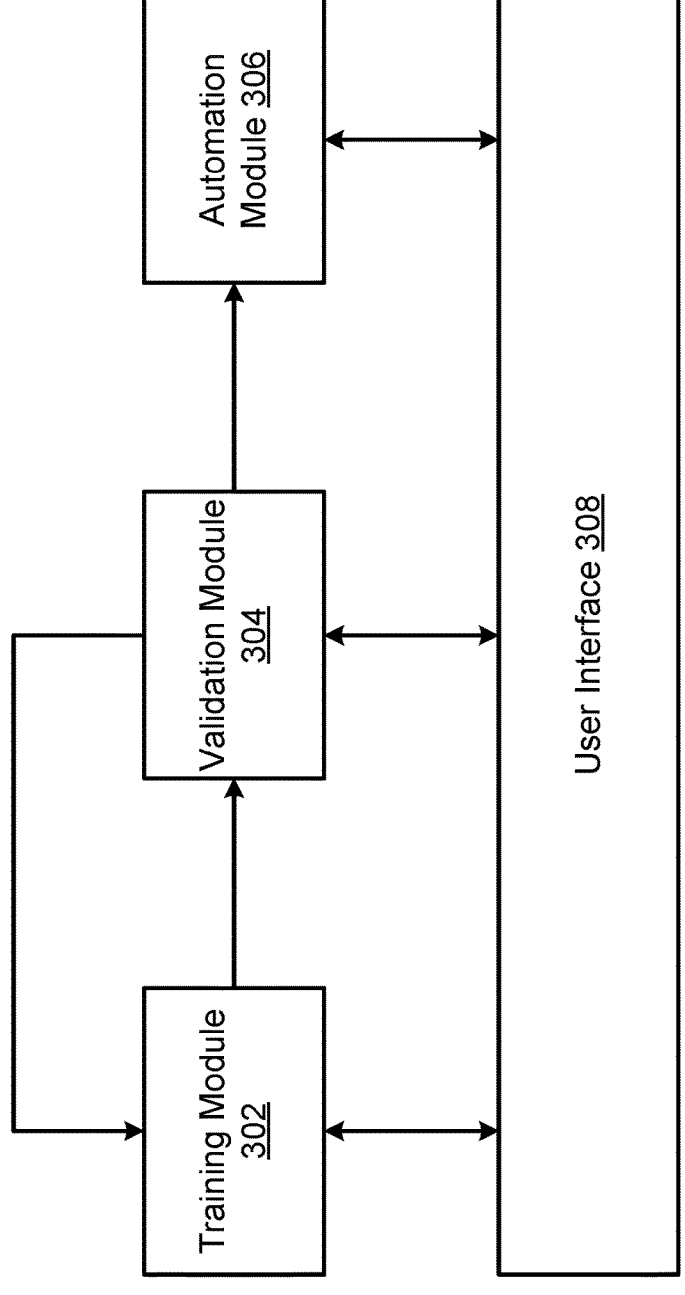
FIG. 3 is a block diagram of a system for cybersecurity incident investigation automation, according to at least one embodiment.

Referring now to FIG. 3, a block diagram of a cybersecurity response automation system 300 is depicted according to one or more embodiments. The cybersecurity response automation system 300 may include, among other things, a training module 302, a validation module 304, an automation module 306, and a user interface 308.

The training module 302 may be used for observation of a cybersecurity analyst by a machine learning model for initial training of the machine learning model. The training module 302 may observe as an analyst initiates an investigation by clicking on a potential threat displayed on the user interface 308. The training module 302 may record all the mouse clicks, data content displayed on the user interface 308, and transcribed speech-to-text corresponding to the analyst verbally narrating what they are doing on the user interface 308 and why. The user interface 308 may also display additional evidence to the analyst. Such evidence may be recorded by the training module 308. The analyst may follow up on details through a series of mouse clicks on the user interface 308 and may evaluate information learned in order to make a True/False decision on this threat to closes it context or escalate it with the evidence. The training module 302 may correlate the actions taken by the analyst with a timestamped transcription of the verbal narrative in order to learn how to respond to potential threats.

The validation module 304 may be used to assess how the machine learning model has learned from observing the analyst through the training module 302. As an analyst investigates a threat and details are shown on the user interface 308, the validation module 304 may provide recommendations of follow-up actions, such as external data lookups or logging of searches performed to collect more evidence for a particular type of threat. The analyst may validate the recommendations of the validation module 304, provide additional narration with their rationale, and study additional evidence through the user interface 308. The validation module 304 may make recommendations as to the meaning of the additional evidence and may recommend a threat disposition. The analyst may evaluate this information and confirm the decision based on the recommendation. The validation module 304 may make a recommendation of any follow-up actions, such as generating an email notification of the potential threat, which the analyst may approve and perform. All analyst validation of recommendation actions may be recorded by the validation module 304 and fed back into the next training phase of the machine as reinforcement learning by the training module 302.

After training and validation of the machine learning model, the automation module 306 may be deployed to automatically evaluate threats and launch all follow-up data lookups and additional information gathering. The automation module 306 may evaluate all collected evidence and provides a recommended threat disposition action. Upon validation of the recommendation and approval of the disposition action by an analyst, the automation module 306 may take the response action automatically.

Referring now to FIG. 4, an operational flowchart illustrating the steps of a method 400 carried out by a program for automated cybersecurity incident response is depicted. The method 400 may be described with the aid of the exemplary embodiments of FIGS. 1-3.

At 402, the method 400 may include identifying and categorizing, by a machine learning model, a potential cybersecurity threat. The machine learning model corresponds to a transformer architecture. The machine learning model is trained based on associating actions taken by the cybersecurity analyst with a verbal narrative spoken by the cybersecurity analyst providing a rationale behind the actions taken. Associating the actions taken by the cybersecurity analyst with the verbal narrative includes generating a click graph of all actions taken by the cybersecurity analyst, generating a timestamped transcript of the verbal narrative, and matching the actions of the click graph with timestamped transcript. In operation, the automation module 306 (FIG. 3) may include a machine learning model that may be respectively trained and validated by the training module 302 (FIG. 3) and the validation module 304 (FIG. 3). The automation module 306 may record interactions taken by a cybersecurity analyst through the user interface 308 (FIG. 3) in response to a potential threat and may associate narrative data with the potential threat.

At 404, the method 400 may include gathering, by the machine learning model, evidence associated with the potential cybersecurity threat. The evidence may include whether a potential threat may be a true or false positive, whether there may be enough information to escalate a potential threat, whether the information is accurate, and what actions has an attacker taken. In operation, the automation module 306 (FIG. 3) may gather evidence about the potential threat and may display it to the cybersecurity analyst through the user interface 308 (FIG. 3).

At 406, the method 400 may include evaluating, by the machine learning model, the potential cybersecurity threat based on the gathered evidence. The machine learning model may be trained to draw assumptions from the evidence in relation to the potential cybersecurity threat. In operation, the automation module 306 (FIG. 3) may determine the potential threat is credible and may determine action may need to be taken in response.

At 408, the method 400 may include providing, by the machine learning model, a recommendation corresponding to one or more actions to take in response to the potential cybersecurity threat to a cybersecurity analyst. The provided recommendation includes explanations of assumptions made by the machine learning model from the gathered evidence. The machine learning model is also trained through reinforcement learning based on validating whether the provided recommendation is appropriate for the potential cybersecurity threat. In operation, the automation module 306 (FIG. 3) may display a recommendation of next steps to the cybersecurity analyst through the user interface 308 (FIG. 3) and may await confirmation from the analyst.

At 410, the method 400 may include performing, by the machine learning model, a follow-up action in response to the potential cybersecurity threat based on input from the cybersecurity analyst. The follow-up action corresponds to one or more from among closing the potential cybersecurity threat with context, escalating the potential cybersecurity with the gathered evidence, and generating an email notification of the potential cybersecurity threat. In operation, the automation module 306 (FIG. 3) may follow-up on the threat, including taking corrective action, escalating to a higher level, or closing the investigation.

It may be appreciated that FIG. 4 provides only an illustration of one implementation and does not imply any limitations with regard to how different embodiments may be implemented. Many modifications to the depicted environments may be made based on design and implementation requirements.

Thus, the method, computer system, and computer program product disclosed herein may allow a machine learning model to follow an analyst through their workflow as the analyst clicks on evidence and new information is surfaced, researches pieces of content, and reaches a stage of confidence in determining next steps. The machine learning model may gather from the analyst's investigation process whether a potential threat may be a true or false positive, whether there may be enough information to escalate a potential threat, whether the information is accurate, and what actions has an attacker taken.

Some embodiments may relate to a system, a method, and/or a computer program product at any possible technical detail level of integration. The computer program product may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer program product may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
identifying and categorizing, by a machine learning model, a potential cybersecurity threat, wherein the machine learning model is trained based on associating actions taken by a cybersecurity analyst with a verbal narrative spoken by the cybersecurity analyst providing a rationale behind the actions taken, wherein associating the actions taken by the cybersecurity analyst with the verbal narrative comprises:
generating a click graph of at least two actions taken by the cybersecurity analyst;
generating a timestamped transcript of the verbal narrative; and
matching actions of the click graph with the timestamped transcript;
gathering, by the machine learning model, evidence associated with the potential cybersecurity threat;
evaluating, by the machine learning model, the potential cybersecurity threat based on the gathered evidence;
providing, by the machine learning model, a recommendation corresponding to one or more actions to take in response to the potential cybersecurity threat to the cybersecurity analyst; and
performing, by the machine learning model, a follow-up action in response to the potential cybersecurity threat based on input from the cybersecurity analyst.

2. The method of claim 1, wherein the machine learning model is trained through reinforcement learning based on validating whether the provided recommendation is appropriate for the potential cybersecurity threat.

3. The method of claim 1, wherein the provided recommendation further includes explanations of assumptions made by the machine learning model from the gathered evidence.

4. The method of claim 1, wherein the follow-up action is selected from a group consisting of closing the potential cybersecurity threat with context, escalating the potential cybersecurity with the gathered evidence, and generating an email notification of the potential cybersecurity threat.

5. The method of claim 1, wherein the machine learning model corresponds to a transformer architecture.

6. A computer system comprising:
a processor set;
one or more computer-readable storage media; and
program instructions stored on the one or more computer-readable storage media to cause the processor set to perform operations comprising:
identifying and categorizing, by a machine learning model, a potential cybersecurity threat, wherein the machine learning model is trained based on associating actions taken by a cybersecurity analyst with a verbal narrative spoken by the cybersecurity analyst providing a rationale behind the actions taken, wherein associating the actions taken by the cybersecurity analyst with the verbal narrative comprises:
generating a click graph of at least two actions taken by the cybersecurity analyst;
generating a timestamped transcript of the verbal narrative; and
matching actions of the click graph with the timestamped transcript;
gathering, by the machine learning model, evidence associated with the potential cybersecurity threat;
evaluating, by the machine learning model, the potential cybersecurity threat based on the gathered evidence;
providing, by the machine learning model, a recommendation corresponding to one or more actions to take in response to the potential cybersecurity threat to the cybersecurity analyst; and performing, by the machine learning model, a follow-up action in response to the potential cybersecurity threat based on input from the cybersecurity analyst.

7. The computer system of claim 6, wherein the machine learning model is trained through reinforcement learning based on validating whether the provided recommendation is appropriate for the potential cybersecurity threat.

8. The computer system of claim 6, wherein the provided recommendation further includes explanations of assumptions made by the machine learning model from the gathered evidence.

9. The computer system of claim 6, wherein the follow-up action is selected from a group consisting of closing the potential cybersecurity threat with context, escalating the potential cybersecurity with the gathered evidence, and generating an email notification of the potential cybersecurity threat.

10. The computer system of claim 6, wherein the machine learning model corresponds to a transformer architecture.

11. A computer program product comprising:

one or more computer-readable storage media; and program instructions stored on the one or more computer-readable storage media to perform operations comprising identifying and categorizing, by a machine learning model, a potential cybersecurity threat, wherein the machine learning model is trained based on associating actions taken by a cybersecurity analyst with a verbal narrative spoken by the cybersecurity analyst providing a rationale behind the actions taken, wherein associating the actions taken by the cybersecurity analyst with the verbal narrative comprises:

generating a click graph of at least two actions taken by the cybersecurity analyst;

generating a timestamped transcript of the verbal narrative; and matching actions of the click graph with the timestamped transcript;

gathering, by the machine learning model, evidence associated with the potential cybersecurity threat;

evaluating, by the machine learning model, the potential cybersecurity threat based on the gathered evidence;

providing, by the machine learning model, a recommendation corresponding to one or more actions to take in response to the potential cybersecurity threat to the cybersecurity analyst; and performing, by the machine learning model, a follow-up action in response to the potential cybersecurity threat based on input from the cybersecurity analyst.

12. The computer program product of claim 11, wherein the machine learning model is trained through reinforcement learning based on validating whether the provided recommendation is appropriate for the potential cybersecurity threat.

13. The computer program product of claim 11, wherein the provided recommendation further includes explanations of assumptions made by the machine learning model from the gathered evidence.

14. The computer program product of claim 11, wherein the follow-up action is selected from a group consisting of closing the potential cybersecurity threat with context, escalating the potential cybersecurity with the gathered evidence, and generating an email notification of the potential cybersecurity threat.

* * * * *